United States Patent [19]

Wagener et al.

[11] Patent Number: 4,874,321

[45] Date of Patent: Oct. 17, 1989

[54] ADAPTER

[75] Inventors: Hans Wagener, Dietzholztal; Jurgen Zachrei, Dillenburg, both of Fed. Rep. of Germany

[73] Assignee: Rittal-Werk Rudolf Loh GmbH & Co., KG, Herborn, Fed. Rep. of Germany

[21] Appl. No.: 131,750

[22] Filed: Dec. 11, 1987

[30] Foreign Application Priority Data

Dec. 12, 1986 [DE] Fed. Rep. of Germany ....... 3642517

[51] Int. Cl.$^4$ .................... H01R 25/14; H01R 4/30
[52] U.S. Cl. .................................. 439/119; 439/110; 439/813
[58] Field of Search ............... 439/110, 116, 117, 207, 439/212, 214, 811, 812, 813, 119, 121

[56] References Cited

U.S. PATENT DOCUMENTS 4,358,815 11/1982 Koslosky et al. ............... 439/207 X

FOREIGN PATENT DOCUMENTS 2030449 1/1972 Fed. Rep. of Germany ...... 439/207

Primary Examiner—Eugene F. Desmond

[57] ABSTRACT

An improved space-saving and clearly arranged adapter apparatus for mechanical and electrical connection of installation devices such as automatic circuit breakers, motor protection switches, contactors, protectors, relays, and the like with bus rails of a bus bar system. The apparatus has an adapter housing which can be placed on the bus rails, contact bars in the housing, and adjustable clamps for mechanically and electrically connecting the contact bars to the bus rails. The contact bars extend to a connector side of the adapter housing and there form connectors for leads. The adapter housing has on its front a mounting bracket for mounting of installation devices.

13 Claims, 2 Drawing Sheets

ADAPTER

FIELD OF THE INVENTION

This invention is related to adapter apparatus for electrical and mechanical connection of installation devices such as automatic circuit breakers, motor protection switches, contactors, switch protectors, relays and the like to bus bar systems, particularly installation devices having a mounting foot for standardized mounting brackets.

BACKGROUND OF THE INVENTION

Installation devices of the type just mentioned can be fastened quickly and simply to electrical adapter apparatus by means of standardized mounting brackets. In switching boards and similar set-ups of the prior art, the mounting brackets are arranged separately from the bus rails which may be present. The installation devices are connected to each other or to the bus rails by means of connector leads for which separate connector clamps are used for electrical and mechanical connection of bus rails and installation devices.

This type of connection requires not only different parts but corresponding room on the switching board. In addition, leading the connections from the bus rails to the installation devices mounted on the mounting bracket or between the installation devices involves the danger of mis-connections and mix-ups.

OBJECT OF THIS INVENTION

It is the object of this invention to provide an improved adapter apparatus, of the type generally mentioned above, allowing installation devices to be connected with the bus rails of a bus bar system in the same simple way as before, but which is a space-saving and more clearly-organized structure.

SUMMARY OF THE INVENTION

This invention achieves this objective in the following manner. An adapter housing which may be set over the bus rails has contact bars therein held with clamps against their respective bus rails, the contact bars being mechanically and electrically connected with the bus rails by means of the adjustable clamps. The contact bars extend to a connector side of the adapter housing and form there connectors for leads. The adapter housing has at its front a mounting bracket for mounting installation devices.

This adapter apparatus is placed directly on the bus rails such that the clamps take care of the mechanical and electrical connection. Installation devices are connected to the mounting bracket in the standard manner. Short leads extending between the connectors of the contact bars and the installation devices complete the connection of the installation devices in a clear arrangement, from which leads go then off to the circuit.

In order that the contact bars and clamps remain firmly attached to the adapter housing, features of this invention provide: that the contact bars be connected to the adapter housing by means of screws; that the contact bars be accessible at the rear of the adapter housing; and that the clamps be held to the contact bars by means of clamp screws and be adjustable vertically with respect to the bus rails. Provision is made in this invention for easy servicing by the clamp screws being accessible and operable from the front of the adapter housing.

One feature of this invention provides for secure setting of the clamps and their bracing against the bus rails by the clamps being U-shaped with cross-braces and side legs with perpendicularly offset jaws at the free ends of the side legs, the clamps engaging the contact bars with the side legs. The cross-braces are arranged alongside the contact bars in a direction facing away from the bus rails, and the jaws of the side legs of the clamps engage the rear of the rectangularly cross-sectioned bus rails.

Provision may be made such that the narrow widths of the clamp side legs corresponds to the spacing between the contact bars. This allows the adjustable clamps to be held immovably with respect to the contact bars.

Setting the clamps is carried out easily by means of clamp screws which are adjustable in threaded holes in the clamp cross-braces. Provision is made in this invention for the clamp screws, which extend through the clamp cross-braces, to be held in fixed axial position, aligned with their respective contact bars, while still allowing turning. This also allows the clamp screws to be held in the adapter housing without being lost.

Connection of the leads which go to the installation devices is made easier by the fact that the contact bars run and are arranged along a narrow dimension of the adapter housing, and by the fact that the contact bars have threaded connector means, including clamp screws, along an area of the connection side. With the connector clamp screws and standard clamp plates, the insulated ends of the leads can be connected mechanically and electrically to the contact bars of the adapter apparatus, and thereby to the bus rails of the bus bar system.

An additional feature of this invention is to provide an installation-device mounting bracket which is removably connected to the adapter housing, and various types of different mounting brackets may be connected to the adapter housing. Thus, the adapter apparatus can thus be adapted to the different types of installation devices with corresponding mounting feet.

The conductive parts of the adapter apparatus can be kept shielded by means of cover plates over the adapter housing. Such cover plates are equipped with plugs which can be inserted into sockets formed in the adapter housing.

Access to the lead connectors of the adapter apparatus of this invention is made easy by shielding the contact bar connector area, along the connector side, by means of a separate detachable cover plate.

A preferred feature of this invention is the fact that the installation-device mounting bracket is U-shaped in cross-section, with side portions with free edge portions which extend perpendicularly therefrom toward the outside. Such free edges of the bracket side portions are received in a pair of opposed recesses in the mounting foot of the installation devices and are secured there. Sufficiently firm engagement of the installation device on the support rail is achieved by the fact that one of the free edges fits snugly into one of the recesses, while the other free edge is braced in the other recess by tension.

BRIEF DESCRIPTION OF THE DRAWINGS

The invention is explained in greater detail by reference to drawings illustrating an example, in which.

DETAILED DESCRIPTIONS OF PREFERRED EMBODIMENTS

The illustrated adapter apparatus serves to electrically and mechanically connect installation devices 10 such as automatic circuit breakers, motor protection switches, contactors, switch protectors, relays, etc., with the bus rails 12, 14, and 16 of a bus bar system.

Figure 2:
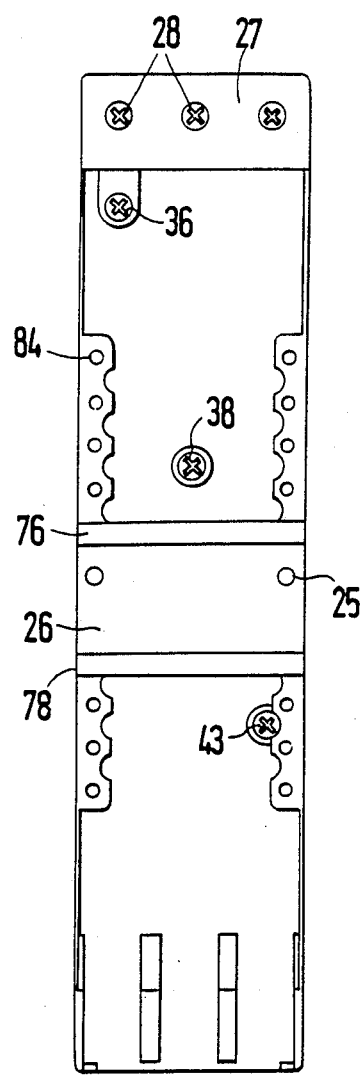
FIG. 2 is an elevation of the apparatus of FIGURE 1, taken from the direction of arrow II shown in FIG. 1.

The adapter apparatus of this invention includes an adapter housing 18 in which contact bars 30, 32, and 34 are held for bus rails 12, 14, and 16, and arranged in such a way that they are facing bus rails 12, 14 and 16 and are accessible from the rear of the adapter housing 18. As can be seen, contact bars 30 32 and 34 are screwed tightly to the plastic housing 18 by screws 70, 72, and 74 in positions beside each other and insulated from one another by a given distance. Contact bars 30, 32 and 34 are arranged along the adapter housing's narrow dimension, which is parallel to bus rails 12, 14 and 16. Contact bars 30, 32 and 34 are angled in such a way that they are accessible with their connecting ends toward the front. The connectors 28 form clamp connections using clamp plates and connector clamp screws to which the leads for installation devices 10 can be mechanically and electrically attached. Contact bars 30, 32 and 34 are narrow so that the phase clearance between the connectors 28 can be kept small (see FIG. 2) and can correspond to the phase clearance of, for example, a three-phase installation device 10.

Clamp screws 36, 38 and 40 can be turned while remaining in fixed axial position. Clamp screws 36, 38 and 40 are held in shell-shaped recesses in the adapter housing 18 and can be operated from the housing front. In this case, clamp screws 36, 38 and 40 can be turned in threaded holes in cross-braces 56, 58 and 60 of the U-shaped clamps 23, 22 and 24. Clamps 23, 22 and 24 engage contact bars 30, 32 and 34 with their side legs 50, 52 and 54. Since the narrow widths of side legs 50, 52 or 54 (in a front-to-back direction in FIG. 1, i.e., in a direction into the drawing) approximates the spacings between adjacent pairs of contact bars 30, 32 and 34, clamps 23, 22 and 24 cannot twist when they are adjusted vertically across bus rails 12, 14 and 16. The free ends of side legs 50, 52 and 54 of clamps 23, 22 and 24 are formed as angled jaws 42, 44 and 46 which engage the backs of bus rails 12, 14 and 16 after being placed over them. This means that the rear of adapter housing 18 must be shaped so that it permits transverse twisting with respect to bus rails 12, 14 and 16 in order to guide jaws 42, 44 and 46 behind bus rails 12, 14 and 16. With clamp screws 36, 38 and 40, clamps 23, 22 and 24 are adjusted vertically to bus rails 10, 12 and 14 until the contact bars 30, 32 and 34 are connected firmly mechanically, and thus electrically, for conduction with bus rails 12, 14 and 16. The double contact between jaws 42, 44 and 46 of side legs 50, 52 and 54 of clamps 23, 22 and 24 thus allows not only a small contact resistance, but also a symmetrical bracing with contact bars 30, 32 and 34, which rest flush on bus rails 12, 14 and 16 with the ends protruding beyond screws 70, 72 and 74.

Figure 1:
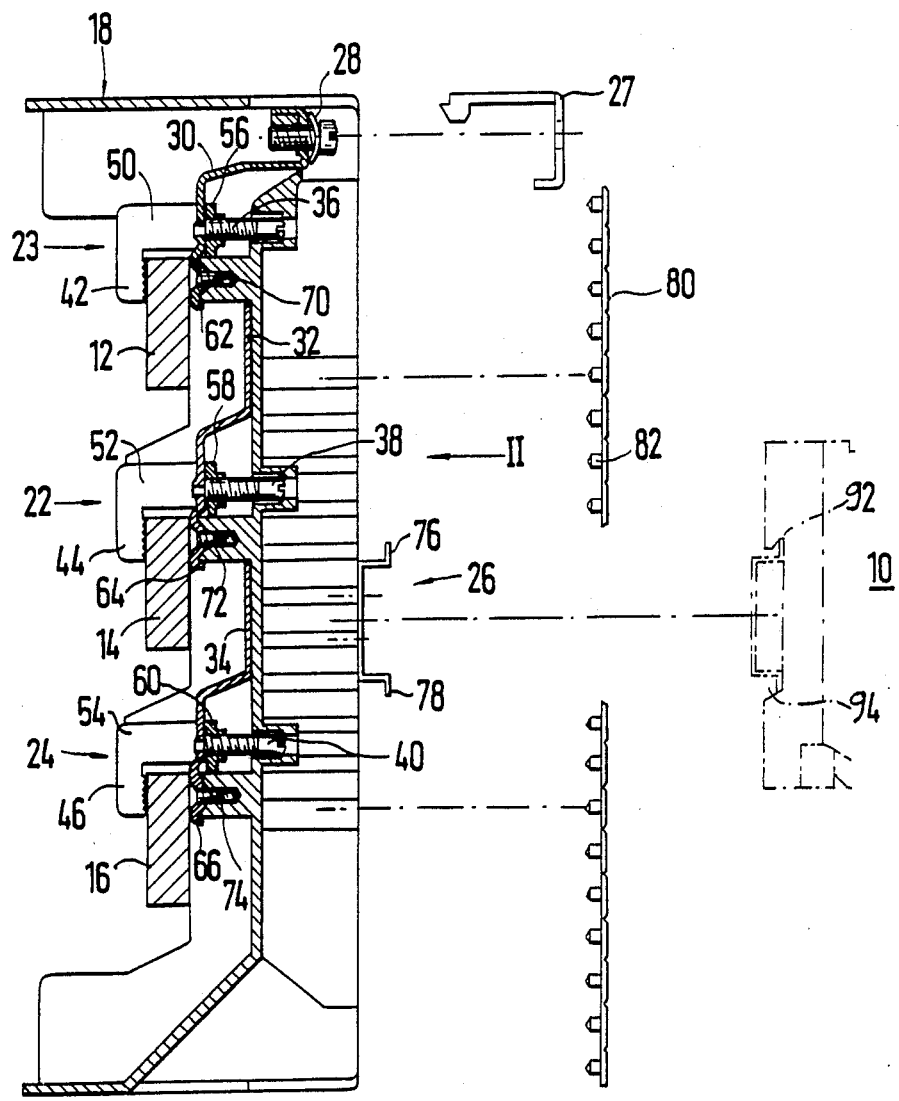
FIG. 1 is a side sectional view of an adapter apparatus in accordance with this invention placed on the bus rails of a bus bar system.

Attachments with apertures 84 are formed on the inside of the side walls of adapter housing 18. Self-tapping screws 25 can be inserted into apertures 84, and by this an installation-device mounting bracket 26 can be joined with adapter housing 18. Mounting bracket 26 extends over the width of adapter housing 18 and is essentially U-shaped, as FIG. 1 shows, including side portions with perpendicularly-extending free edges 76 and 78 which are directed toward the outside. Installation device 10 has corresponding recess edges 92 and 94 in a mounting foot. In this case recess edge 92 can accept free edge 76 of mounting bracket 26 snugly, while free edge 78 is braced under tension in recess edge 94. As already mentioned, mounting bracket 26 can also have a different cross-sectional shape and accept installation devices 10 with correspondingly adapted mounting feet. It requires no more than that a corresponding mounting bracket 26 be attached to adapter housing 18.

Figure 3:
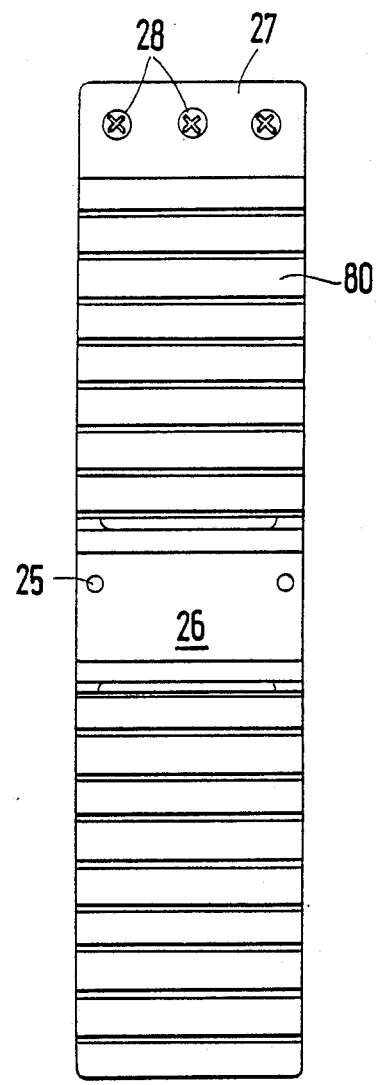
FIG. 3 is another view as in FIG. 2, but with the front of the device covered.

If the adapter apparatus is connected firmly with bus rails 12, 14 and 16, then the open front is shielded beyond support rail 26 by means of cover plates 80. Cover plates 80 have plugs 82 on their undersides which are inserted into sockets 84 of adapter housing 18. The area with connectors 28 is shielded by means of a separate cover cap 27 in order to make access to the connectors 28 easier even when the adapter apparatus is attached. As FIG. 3 shows, only the connector clamp screws of connectors 28 are accessible when the adapter apparatus is mounted. Installation devices 10, which are placed on support rail 26, can be connected quickly and easily with connectors 28.

Bus rails of various thicknesses and widths are used in bus bar systems. In order to make the adapter apparatus of this invention universally usable, a further refinement provides that the adjusting range of the clamps be adapted to the maximum thickness of the bus rails of the bus bar system, and provides recesses on the rear of the adapter housing in the area of the clamps which correspond in width to the maximum width of the bus rails of the bus bar system plus the width of the jaws of the clamps.

In the event that the adapter apparatus is to be used for bus bar systems with varying spacing between the bus rails, then an additional provision is made for the clamps to be adjustable with respect to the contact bars and set for different spacings between the bus rails of the bus bar system.

While the principles of this invention have been described in connection with specific embodiments, it should be understood clearly that these descriptions are made only by way of example and are not intended to limit the scope of the invention.

What is claimed is:

1. An adapter apparatus for mechanical and electrical connection of installation devices such as automatic circuit breakers, motor protection switches, contactors, relays, and the like with bus rails of a bus bar system which can accommodate installation devices equipped with mounting feet for standard mounting brackets, comprising:
    an adapter housing which may be placed over the bus rails, the housing having a front and a rear;
    at least one contact bar secured to the housing, the contact bar extending to the front side to form lead connector points;
    an adjustable clamp secured to each contact bar and facing a respective bus rail; and means on the front of the adapted housing for mounting of installation devices.

2. The adapter apparatus of claim 1 wherein:
there are a plurality of the contact bars and the contact bars are connected to the adapter housing by screws;
the contact bars are accessible from the rear of the adapter housing; and
the clamps are fixed to the contact bars by clamp screws allowing adjustment of the clamps with respect to the bus rails.

3. The adapter apparatus of claim 2 wherein the clamp screws are accessible and can be operated from the front of the adapter housing.

4. The adapter apparatus of claim 1 wherein there are a plurality of the contact bars adjacent to one another to form at least one adjacent pair of such bars and wherein each clamp is U-shaped, having a cross-brace which extends beside the contact bars facing away from the bus rails and a side leg with a jaw at the free end of the side leg engagable with one of the bus rails at a position behind such bus rail.

5. The adapter apparatus of claim 4 wherein the adjacent bars of said at least one pair of contact bars are closely spaced and have one of said side legs therebetween, said side leg dimensioned to fit between such contact bars.

6. The adapter apparatus of claim 4 wherein the cross-braces have threaded holes, the clamp screws being adjustable in the threaded holes.

7. The adapter apparatus of claim 6 wherein the clamp screws extend through the cross-braces and are rotatably held in fixed axial position against there respective contact bars.

8. The adapter apparatus of claim 1 wherein the adjusting range of the clamps is adapted to the maximum thickness of the bus rails of the bus bar system, and the adapted housing has on its rear a recess in the area of the clamps, the width of such recess corresponding to the maximum width of the bus rails of the bus bar system plus the width of the clamp jaws.

9. The adapter apparatus of claim 1 further including:
a plurality of sockets in the adaptor housing along the front thereof; and
at least one cover plate at the front of the adapter housing, the cover plates having plugs inserted into the sockets.

10. The adapter apparatus of claim 1 wherein there are a plurality of the contact bars and the contact bars are arranged along a narrow dimension of the adapter housing which is parallel to the bus rails, and extend to the front of the housing, the contact bars having holes for connector clamp screws at the front of the housing.

11. The adapter apparatus of claim 10 wherein the connector clamp screws for the contact bars are covered by a separate detachable cover plate.

12. The adapter apparatus of claim 1 wherein an installation-device mounting bracket is removably connected to the adapter housing.

13. The adapter apparatus of claim 12 wherein the installation-device mounting bracket is U-shaped in cross-section and further has outwardly-extending free edges receivable in a pair of opposed recess edges in a mounting foot of an installation device.

* * * * *